No. 781,612. Patented January 31, 1905.

UNITED STATES PATENT OFFICE.

MARK WORSNOP MARSDEN, OF PHILADELPHIA, PENNSYLVANIA.

METHOD OF UTILIZING WASTE SUBSTANCES OF THE COTTON-PLANT AND PRODUCT THEREOF.

SPECIFICATION forming part of Letters Patent No. 781,612, dated January 31, 1905.

Original application filed January 7, 1904, Serial No. 188,148. Divided and this application filed March 16, 1904. Serial No. 198,482.

*To all whom it may concern:*

Be it known that I, MARK WORSNOP MARSDEN, a citizen of the United States, residing at Philadelphia, in the county of Philadelphia and State of Pennsylvania, have invented new and useful Improvements in Methods of Utilizing Waste Substances of the Cotton-Plant and Product Thereof, of which the following is a specification.

This invention relates to the treatment and utilization of the hitherto wasted substances of the cotton-plant—that is to say, what remains of the plant after harvesting the matured cotton—and is a division of application Serial No. 188,148.

The principal objects of the invention are to convert the so-called "waste" substances or products into a disintegrated fiber useful in the manufacture of paper and also available in the manufacture of textile fabrics and felted goods.

In America, India, and Egypt the cotton-plant is cultivated as an annual; but in the Brazils the plant assumes an arborescent or tree-like form and produces cotton-bolls for several years in succession. It is therefore termed a "perennial" plant. In the United States the main stalk or stem of the cotton-plant grows generally to a height of from four to six feet. It has numerous auxiliary stems or branches, which lengthen in growth, and these produce the first flowers and cotton-pods. The main stalk is made up largely of soft woody or cellulose tissue, seemingly mixed with pectose material and an outer layer of bark containing bast fibers. The stems or branches contain what is ordinarily called "pith" or cork-like tissue, around this a woody layer, and then a bark containing bast fibers. The relative amount of bast or long fibers is therefore larger in the branches than in the heavy stalk. The presence of a large percentage of short woody fibers in admixture in this material will be of benefit to it for paper-making, as one class of fibers will complement the other, the long fibers interlacing and strengthening the sheet and the shorter ones filling in and giving it body. It is thus evident that the cotton-stalk is a vast source of technically-valuable fiber.

In the practice of the invention the plants after harvesting are pulled or otherwise detached from the soil and the dirt and dust removed therefrom in any suitable and convenient manner—for instance, by the action of the well-known rotatable duster. The stock, consisting of the stalks, stems, and roots, is then comminuted and crushed in any suitable manner and the communited and crushed mass washed in clear water to free it of foreign substances or impurities. The cleansed, comminuted, and crushed mass is then subjected for a period of from three to six hours, more or less, to the action of steam at fifty to sixty pounds pressure, more or less, and water. This may be accomplished in a steam-tight retort, to which I add clear water for saturation. The purpose of this treatment with heat, moisture, and pressure is to extract sugar, tannin, natural coloring-matter, and other chemicals present, all of which, whether singly or collectively, are hereinafter referred to by the term "extractive matter." This treatment seems to act on the pectin present in admixture with the cellulose in the woody part, dissolving this and converting the starchy matter and invertible carbohydrates of the bark into sugars, while at the same time it loosens up and partially frees the fibers from cementing matters and mineral salts. Under this treatment the stems will yield an abundance of short cellulose fibers from the woody tissue and a relatively smaller amount of long bast fiber, together with sugars, from the invertible carbohydrates, while the branches will yield a larger amount of bast fibers and fermentable sugars and less of the shorter cellulosic fibers. When the treatment has progressed so far that the extractive matter is separated and in solution, it is drained off into another retort or tank and recovered as described in my application aforementioned. This extractive matter has heretofore been one of the chief obstacles to the successful treatment of the cotton-plant to obtain a commercial disintegrated fiber; but it is readily removed by my process and in a condition to be easily recovered. The wood and bark contained in the stalks, stems, and roots being in a comminuted and crushed state and deprived of extractive matter, are in a desirable form to be still further reduced by the addition of a sulfid or alkaline solution of sufficient strength to dissolve under a steam pressure of seventy-five to ninety pounds, more or less, the resinous or silicious material present in the form of cementing or incrusting matter and to separate and disintegrate the fibers. When this has been accomplished, I drain off the liquor and by well-known methods recover the chemicals, which may be used over again in reducing other material. The material remaining in the retort (which has been converted into ligno-cellulose) is next subjected to the action of water and steam until any chemicals present are completely removed, leaving a pure, disintegrated, ligneous, and cellular fiber, which may be spun into yarn or bleached or colored and made into paper.

Paper made from this fiber is much superior to the best wood-pulp papers and has the characteristics of linen paper, as may be inferred from the large percentage of bast fiber, similar to linen fiber, in the pulp, thus proving that writing and other high-grade papers can be made from the cotton-stalk fiber.

It will be obvious to those skilled in the art to which the invention relates that modifications may be made in details without departing from the spirit and scope of the same. Hence I do not limit myself to the precise mode of procedure and the ingredients hereinabove pointed out; but, Having described the nature and objects of the invention, what I claim as new, and desire to secure by Letters Patent, is—

1. The process of obtaining a maximum yield of bast or long fibers and short wood fibers, which consists in comminuting the stalks, stems and roots of the cotton-plant, subjecting the comminuted mass to suitable treatment without the use of reagents to extract sugar, tannin, natural coloring-matter, and other extractive matter, and to start an initial separation, and thereafter subjecting the stock to chemical treatment and high pressure to eliminate the cementing or incrusting matter and to complete the separation, substantially as specified.

2. The process of obtaining a maximum yield of bast or long fibers and short wood fibers, which consists in comminuting the stalks, stems, and roots of the cotton-plant, washing the comminuted mass in clear water, subjecting it in a substantially closed retort to a non-chemical treatment with heat, moisture and pressure to dissolve all extractive matter and to start an initial separation, drawing off the extractive matter, and thereafter subjecting the stock to a suitable alkali treatment at a higher pressure to eliminate the cementing or incrusting matter and to complete the separation, substantially as specified.

3. The process of obtaining a maximum yield of bast or long fibers and short wood fibers, which consists in comminuting the stalks, stems and roots of the cotton-plant, washing the comminuted mass in clear water, subjecting the stock to a non-chemical treatment involving the combined action of heat, moisture, and pressure to dissolve the pectin present in admixture with the cellulose and to convert the starchy matter and invertible carbohydrates of the bark into sugars, and to start an initial separation, drawing off the extractive matter, and thereafter subjecting the stock to suitable chemical treatment and pressure to eliminate the cementing or incrusting matter and to complete the separation, substantially as specified.

4. An improved cotton paper made from the product of the waste substances of the cotton-plant deprived of extractive matter and consisting of bast or long fibers and a large percentage of short woody fibers in admixture therewith whereof one complements the other, the long fibers interlacing and strengthening the sheet and the shorter ones filling in and giving it body, substantially as specified.

In testimony whereof I have hereunto signed my name in the presence of two subscribing witnesses.

MARK WORSNOP MARSDEN.

Witnesses:
JAS. A. RICHMOND,
JOHN W. MARSDEN.